United States Patent Office 3,616,647
Patented Nov. 2, 1971

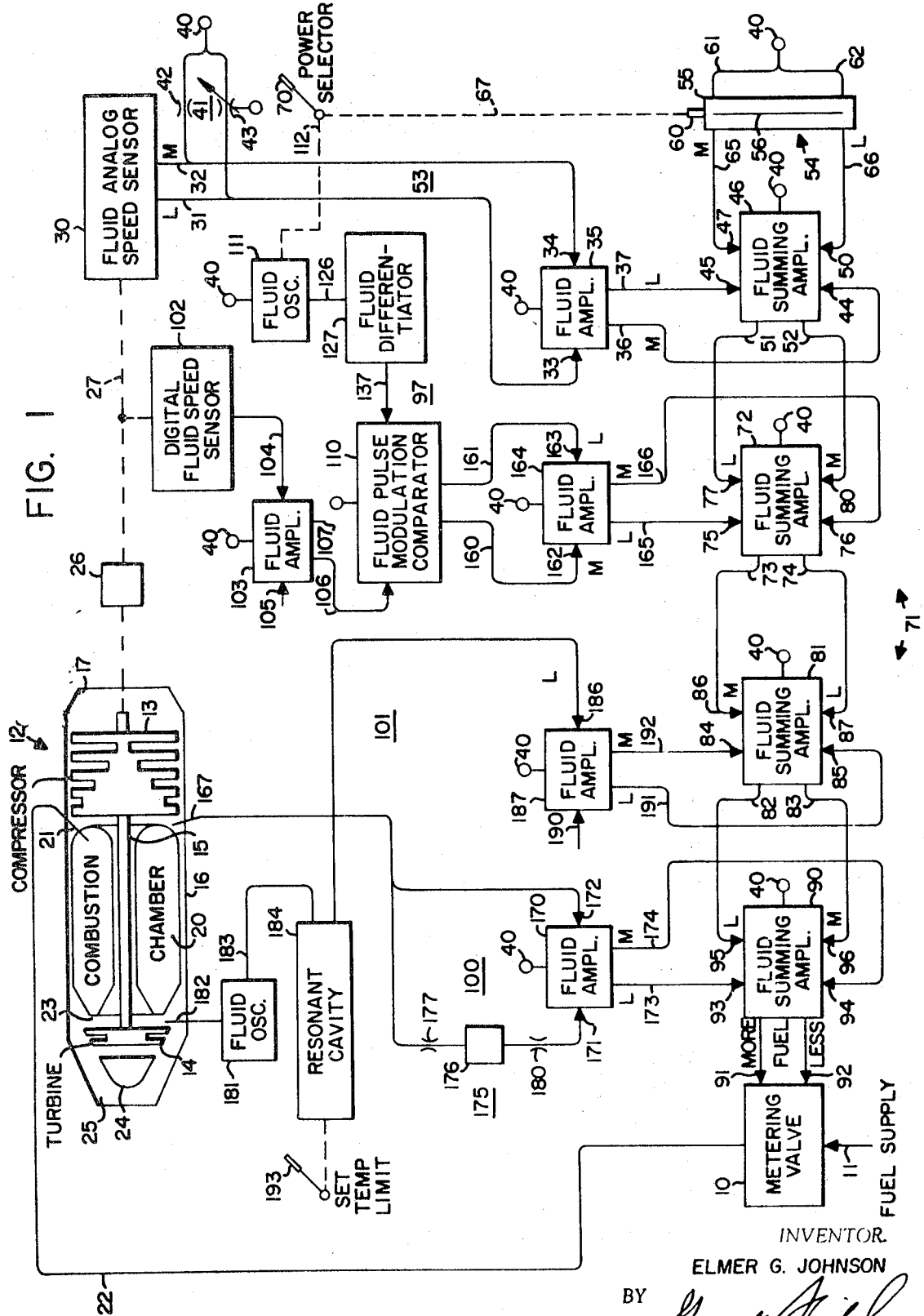

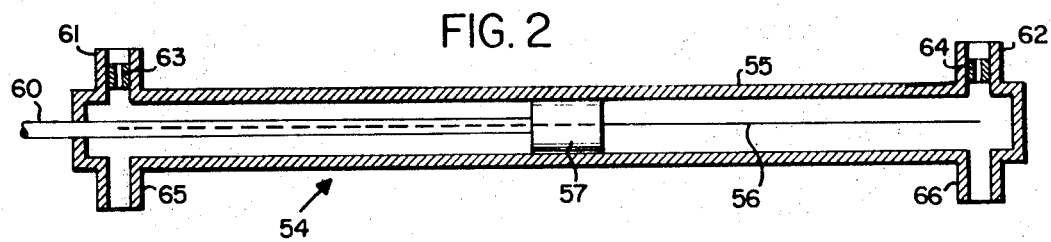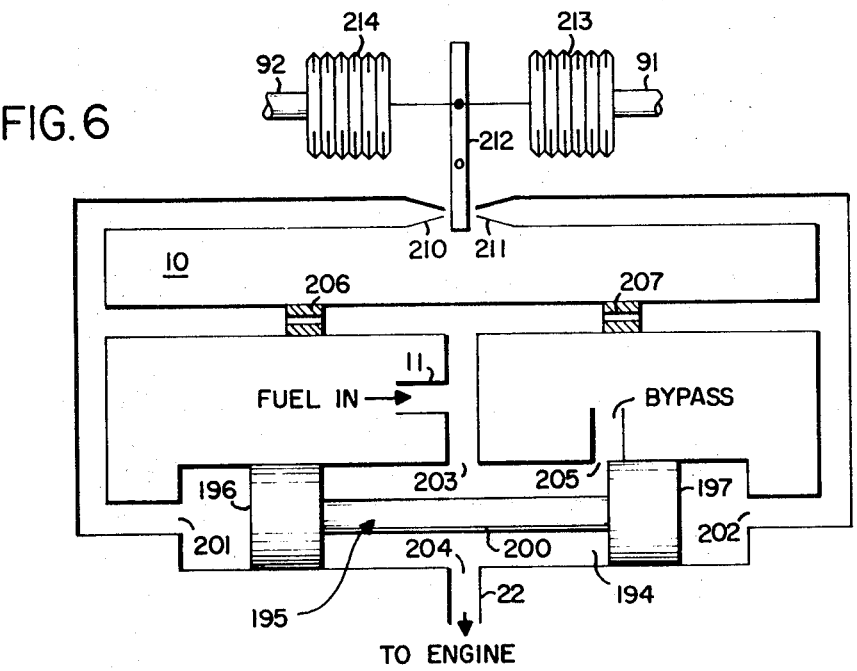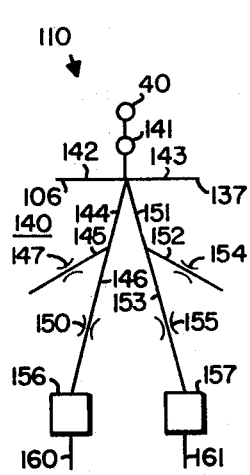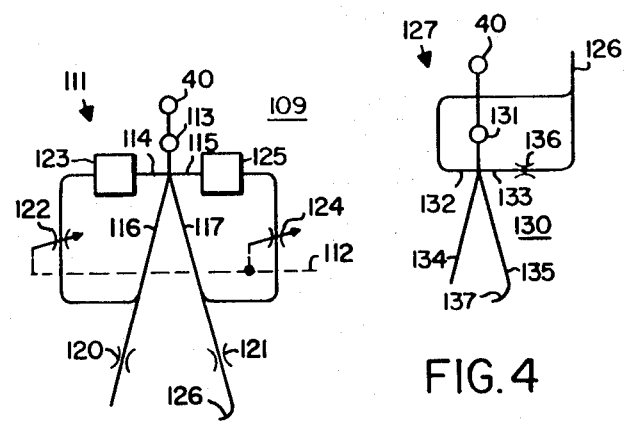

3,616,647
FLUIDIC ENGINE CONTROL SYSTEM
Elmer G. Johnson, Delwood, Minn., assignor to
Honeywell Inc., Minneapolis, Minn.
Filed Jan. 4, 1966, Ser. No. 519,403
Int. Cl. F02c 9/04; F02g 3/00
U.S. Cl. 60—39.28
5 Claims

ABSTRACT OF THE DISCLOSURE

A pure fluid engine control system for controlling the flow of fuel to a gas turbine engine in accordance with a command signal and with the values of various engine variables.

---

This invention relates to the field of control apparatus and, more particularly, to apparatus for controlling the operation of power systems including gas turbine engines and throttle valves therefor. Electrical and hybrid systems for this purpose are known; but since the problem is inherently one of controlling fluid flow, it seemed appropriate to seek for a pure fluid system. That is, a system with no mechanically moving parts and no conversion between different power media, as between electrical and hydraulic energy, for example.

It is a primary object of the invention to provide pure fluid power system control apparatus. Another object of the invention is to provide pure fluid apparatus for regulating the operation of the engine of a power system so that its speed remains that desired. Further objects of the invention are to provide a system with a superimposed limit on the turbine inlet temperature and to provide a system with a superimposed limit on the rate at which the compressor outlet pressure may rise. The invention also includes as one of its objects to provide a combined analog and digital pure fluid system for speed control and like uses.

Various other objects, advantages, and features of novelty not individually enumerated above which characterize my invention are pointed out with particularity in the claims annexed hereto and forming a part hereof. However, for a better understanding of the invention, its advantages, and objects attained by its use, reference should be made to the subjoined drawings, which form a further part hereof, and to the accompanying descriptive matter, in which I have illustrated and described a preferred embodiment of my invention.

In the drawings, FIG. 1 shows power system supervisory apparatus according to the invention, and FIGS. 2 to 5 show more detailed schematics of components appearing as blocks in FIG. 1.

Briefly, the invention comprises means for controlling the metering valve or throttle which supplies fuel to the combustion chamber of a gas turbine engine which is supplied with combustion air from a compressor driven by the turbine, the valve operation being controlled by a manual lever which is effective to adjust reference members in an analog speed channel and a digital speed channel. The channels supply fluid signals to a cascade of fluid summing amplifiers which receive a first overriding signal from a temperature channel in accordance with the turbine inlet temperature, and a second overriding signal from a stall prevention channel in accordance with the rate of rise of compressor outlet pressure. The system will now be described in greater detail.

As shown in FIG. 1, the power system comprises a metering valve or throttle 10, supplied with fuel at 11 by conventional means, and a conventional gas turbine engine 12. The engine comprises a compressor 13 and a turbine 14 supported on a common shaft 15 by bearings. The engine is enclosed in a suitable casing 16 having an inlet duct 17 through which the compressor draws air to supply to a combustion chamber 20 surrounding shaft 15 and located between the compressor and the turbine. Fuel is supplied to a ring of injectors 21 through a conduit 22 from metering valve 10. The hot combustion gases exhaust through nozzles 23 to drive turbine 14, after which they are discharged past a fairing 24 and through an outlet duct 25 in casing 16.

In turboprop engines, shaft 15 carries the propeller and thus mechanically supplies the output of the engine. In turbojet engines, the output is the reaction force produced by the jet of hot gases, and an afterburner may also be provided. Because the invention applies to either type of engine, these and other details have been omitted from the drawing to avoid confusing the showing of the invention by the presence of irrelevant matter.

Shaft 15 is connected through a suitable gear reducer 26 to operate an accessory drive shaft 27; the speed of shaft 27 is thus a measure of the speed of the engine. Driven by shaft 27 is a first speed sensor 30 which supplies a fluid analog engine speed output, in the form of a fluid pressure differential in conduits 31 and 32, to control ports 33 and 34 of a proportional fluid amplifier 35 having a pair of outlet ports 36 and 37 and a power inlet continuously energized with fluid from a source 40 common to many elements in this system. A bias arrangement 41 is also energized from source 40 and supplies fluid to control port 34 through a restriction 42, and to control port 33 through a variable restriction 43. Sensor 30 may be of any suitable type: one such device is disclosed in the co-pending application of Donald J. Erickson, Ser. No. 352,269, filed Mar. 16, 1964 (now Pat. 3,363,453) and assigned to the assignee of the present application.

While a single fluid amplifier such as 35 is shown, it is understood that a cascade of such amplifiers may be used where this appears to the designer to be desirable. In any event an output appears in the form of fluid signals at ports 36 and 37, the latter being greater or less than the former depending on whether the differential pressure is greater or less than an arbitrary value set by bias arrangement 41.

Engine 12 always runs in the same direction, and hence the differential pressure output of speed sensor 30 is always in the same sense, and has a value of zero when the shaft 27 is motionless. The function of bias arrangement 41 is to modify the fluid signals reaching control ports 33 and 34 so that they are equal for some predetermined speed of shaft 27 intermediate between zero and its maximum value. Then for a greater shaft speed the signal at port 33 exceeds that at port 34, while for a lesser shaft speed the signal at port 34 exceeds that at port 33, and operation of amplifier 35 throughout its full range becomes possible.

The signals from amplifier 35 are supplied to oppositely acting control ports 44 and 45 of a fluid summing amplifier 46 continuously supplied with power fluid from source 40 and having a further pair of oppositely acting control ports 47 and 50 and a pair of outputs 51 and 52.

Elements 30 to 52 are part of the analog speed channel 53 of the control system, which also includes a "fluid potentiometer" 54, better shown in FIG. 2, to which reference should now be made. Component 54 is shown to comprise an elongated cylindrical chamber 55 having a narrow slit 56 passing through one wall and extending the full length of the chamber. A piston 57 is slideable in chamber 55 by means of a control rod 60 which passes in slideably sealed relation through one end of the chamber, the other end being sealed. A pair of taps 61 and 62 at opposite ends of the chamber are supplied with fluid from the common source, and contain restrictions 63 and 64. Also located at opposite ends of the chamber are a pair of outlet ports 65 and 66.

If the restrictions are equal, there is no difference between the pressures in output ports 65 and 66 when the piston is at the center of the cylinder. As the piston is moved closer to one end of the chamber, the pressure at the outlet port at that end increases, and that at the other end decreases. Thus by displacement of piston rod 60 linearly a signal can be obtained in the form of a pressure ratio between ports 65 and 66 of variable magnitude and reversible sense. This signal is supplied to control ports 47 and 50 of amplifier 46. Piston rod 60 is actuated through a suitable mechanical connection 67 by a manual power selector 70, as shown in FIG. 1.

Amplifier 46 is the first of a cascade 71 of such amplifiers, each controlled in part by signals from the preceding amplifier, and all continuously supplied with fluid from source 40. Thus summing amplifier 72 has a pair of outlet ports 73 and 74, a first pair of oppositely acting control ports 75 and 76, and a second pair of oppositely acting control ports 77 and 80 connected to outlet ports 51 and 52 of amplifier 46. Summing amplifier 81 has a pair of outlet ports 82 and 83, a first pair of oppositely acting control ports 84 and 85, and a second pair of oppositely acting control ports 86 and 87 connected to outlet ports 73 and 74 of amplifier 72. Summing amplifier 90 has a pair of outlet ports 91 and 92, a first pair of oppositely acting control ports 93 and 94, and a second pair of oppositely acting control ports 95 and 96 connected to outlet ports 82 and 83 of amplifier 81. Outlet ports 91 and 92 are connected to metering valve 10 to control the operation thereof, a signal at outlet port 91 being effective to increase fuel flow while a signal at outlet port 92 decreases the fuel flow.

In addition to channel 53 there are three further channels in the system of FIG. 1, a digital speed channel 97, stall prevention or pressure rate limiting channel 100, and a temperature limiting channel 101. Digital speed channel 97 includes a digital speed sensor 102 driven by shaft 27 to supply to an impedance matching fluid amplifier 103 a train of fluid pulses the repetition rate of which varies with the speed of shaft 27. Sensor 102 may be of any suitable type, for example, a perforated disc may be mounted for rotation with the shaft the speed of which is to be measured so as to interrupt the flow of fluid from a suitable mounted jet to a suitably mounted receiver.

Amplifier 103 has a power inlet continuously energized with fluid from source 40, a pair of oppositely acting control ports 104 and 105, the former receiving the pulse train from sensor 102, and a pair of outlet ports 106 and 107. Amplifier 103 acts in a manner similar to a monostable switch: fluid from source 40 is normally discharged at outlet 107, but each time a pulse is received at control port 104 the stream is momentarily transferred to outlet port 106, returning automatically to outlet port 107 as soon as the pulse at control port 104 disappears.

The pulses at outlet port 106 are supplied to a fluid pulse modulation comparator 110, together with a second train of pulses derived from a fluid oscillator 111 of which the frequency is adjustable by power selector 70 through a mechanical connection 112. As shown in FIG. 3, oscillator 111 comprises a fluid amplifier 109 having a power inlet 113 continuously energized with fluid from source 40, a pair of oppositely acting control ports 114 and 115, and a pair of outlet ports 116 and 117, including restrictions 120 and 121 respectively. Connected between outlet port 116 and control port 114 are a variable restriction 122 and a chamber 123: connected between outlet port 117 and control port 115 are a second variable restriction 124 and a second chamber 125.

Fluid oscillators like oscillator 111 are known in the art. Adjustment of restrictions 124 and 122 varies the time required for signals at the outlet ports to be transmitted to the control ports and switch the fluid stream in the amplifier: the restrictions are oppositely adjustable, one inrceasing as the other is decreasing.

The output of oscillator 111 at 126 is a train of substantially square wave pulses and is supplied to comparator 110 through a fluid differentiator 127 shown in FIG. 4 to comprise a fluid amplifier 130 having a power inlet 131 continuously energized with fluid from source 40, a pair of oppositely acting control ports 132 and 133, and a pair of outlet ports 134 and 135. The fluid signal at 126 is applied to control port 132 directly, and to control port 133 through a restriction 136. In the absence of any control signals, or with equal control signals, the fluid stream discharges from amplifier 130 at 134. A signal at outlet port 126 is effective immediately at control port 132 to transfer the fluid stream to outlet port 135. After a short delay due to restriction 136 and the inherent capacitance of the conduit between capacitance 136 and control port 133, the signal also reaches control port 133, and the stream reverts to outlet port 134. A signal from outlet port 135 is supplied to comparator 110 through a conduit 137.

Comparator 110 is shown in FIG. 5 to comprise a fluid amplifier 140 having an inlet port 141 continuously energized with fluid from source 40, a pair of oppositely acting control ports 142 and 143 receiving the signals from amplifier 103 and differentiator 127 respectively, a first outlet port 144 having branches 145 and 146 containing fixed restrictions 147 and 150, and a second outlet port 151 having branches 152 and 153 containing fixed restrictions 154 and 155. Comparator 110 also includes a pair of closed chambers 156 and 157 connected to restrictions 150 and 155 and supplying outlets at ports 160 and 161 all respectively.

Fluid amplifier 140 functions generally as a bistable switch. A fluid pulse at control port 142 deflects the stream to emerge through restrictions 154 and 155: the fluid flows into chamber 157 faster than it can flow out of 161, and the chamber starts to fill. When a pulse is supplied at control port 143 the flow is deflected to emerge through restrictions 147 and 150, chamber 156 starts to fill, and chamber 157 can now start to empty through restrictions 155 as well as through outlet 161. Since continuous trains of pulses are supplied to the control ports, fluid flows into and out of both chambers alternately, and a pressure difference appears across outlet ports 160 and 161 which is a function of the difference between the repetition rates of the two pulse trains.

Outlets 160 and 161 are connected to the oppositely acting control ports 162 and 163 of a proportional fluid amplifier 164 having a power inlet continuously energized with fluid from source 40 and a pair of outlet ports 165 and 166, which are in turn connected to control ports 75 and 76 of summing amplifier 72.

Stall prevention channel 100 includes a pressure sensor 167 mounted within casing 16 for response to the outlet pressure of compressor 13. This channel also includes a proportional fluid amplifier 170 having a power inlet continuously energized with fluid from source 40, a pair of oppositely acting control ports 171 and 172, and a pair of outlet ports 173 and 174. Sensor 167 is connected to control port 172 directly, and to control port 171 through a delay line 175 including a chamber 176 and a pair of restrictions 177 and 180. Chamber 176 and restrictions 177 and 180 are so proportioned that under normal conditions the signals at control ports 171 and 172 are substantially equal, and substantially equal fluid outputs appear at 173 and 174 are conducted to control ports 93 and 94 of fluid summing amplifier 90. However, in cases of incipient stall the pressure at 167 rises at a high rate: the signal at control port 172 is temporarily much greater than that at control port 171, and the output at 173 becomes much greater than that at 174, thus acting through summing amplifier 90 in a sense to reduce the flow of fluid at valve 10.

Temperature limit channel 101 includes a temperature sensor 181 in the form of fluid oscillator receiving its power fluid from a tap 182 in the turbine inlet area, and is thus powered with the fluid whose temperature is to be measured. Sensor 181 supplies at 183 an output in the form of a train of fluid pressure pulses varying in repetition frequency with the temperature of the fluid. This output is fed through a resonant cavity 184 to supply an output to one control port 186 of a proportional fluid amplifier 187 having a second, oppositely acting control port 190, a pair of outlet ports 191 and 192, and a power inlet continuously energized with fluid from source 40. Cavity 184 is adjustable in size by a temperature limit setting lever 193. Elements 182 through 193 are shown and their operation is described, in the co-pending application of Edward G. Zoerb, Ser. No. 469,972, filed June 30, 1965 and assigned to the assignee of the present invention. It will be appreciated that the showing herein is illustrative only, and that any equivalent temperature responsive means may be used so long as a signal is supplied to control port 186 of amplifier 187 if the turbine inlet temperature exceeds a predetermined value. The outlet ports of amplifier 187 are connected to control ports 84 and 85 of summing amplifier 81.

Valve 10 is of conventional nature, and the detailed schematic in FIG. 6 is for illustrative purposes only. A chamber 194 is shown to contain a spool valve 195 comprising a pair of lands 196 and 197 connected by an intermediate shaft 200. Chamber 194 has a pair of end ports 201 and 202, a pair of central ports 203 and 204, and a further port 205 which may be opened or closed by land 197 as the spool moves to the right or left. Fuel is supplied at 11 to a conduit which connects to port 203 and also through a pair of restrictions 206 and 207 to a pair of opposed nozzles 210 and 211 and to ports 201 and 202 all respectively. A flapper 212 is pivotly mounted for movement between nozzles 210 and 211, in such a manner that as the flapper is physically displaced from a normal position, in which fluid streams issuing from nozzles 210 and 211 are equally impeded, the impedance offered to one stream increases while the impedance offered to the other stream decreases, and the pressures at ports 201 and 202 are no longer equal, so that spool 195 is displaced from its normal central position: the amount of fluid discharged through bypass port 205, and therefore the amount of fuel available to the engine through conduit 22, is varied at the same time. A pair of bellows 213 and 214 are arranged to mechanically displace flapper 212 in one direction or the other accordingly as the pressure in bellows 213 is greater or less than that in bellows 214. Outlet ports 91 and 92 are connected to bellows 213 and 214 respectively.

The operation of this system will now be apparent. Lever 193 is set to determine a particular temperature at which fuel flow will begin to be limited, and power selector 70 is set to call for a desired power output from the engine. The fluid signals from amplifier 35 and fluid potentiometer 54 are summed in amplifier 46, and the resulting output is summed in amplifier 72 with the signal from amplifier 164. As long as the engine speed is that desired, no output is supplied by summing amplifier 90. If the engine speed is less than that selected, a signal appears at port 73 and is transmitted to outlet port 91, pivoting flapper 212 counter-clockwise about its intermediate pivot. This increases the pressure at port 202 with respect to that at port 201, FIG. 6, and spool 195 moves to the left to more completely close bypass port 205, resulting in more fluid flow through port 204 to the engine. This results in increased engine speed, changing the outputs of amplifiers 35 and 164 until the signal to valve 10 becomes zero, when the engine speed is that desired.

It has already been pointed out that if the turbine inlet temperature becomes excessive, a signal is supplied to summing amplifier 81 which acts to reduce the flow of fluid through valve 10, and the same is true if the pressure at the compressor outlet increases at more than a predetermined rate due to incipient stall conditions.

Numerous objects and advantages of my invention have been set forth in the foregoing description, together with details of the structure and function of the invention, and the novel features thereof are pointed out in the appended claims. The disclosure, however, is illustrative only, and I may make changes in detail especially in matters of shape, size, and arrangement of parts, within the principle of the invention, to the full extent indicated by the broad general meaning of the terms in which the appended claims are expressed.

I claim as my invention:

1. In combination:
   a power plant having a fluid therein, said power plant including output means deriving rotary motion from said fluid;
   fluidic temperature sensing means in communication with said fluid, and operable to produce a first fluidic output signal indicative of the temperature of said fluid;
   fluidic speed sensing means connected to said output means and operable to produce a second fluidic output signal indicative of the speed of said output means; and
   control means connected to said power plant, said temperature sensing means and said speed sensing means to receive said first and second fluidic output signals, said control means being effective to vary the flow of fuel to said power plant in response to said first and second fluidic output signals.

2. The combination according to claim 1 wherein said fluidic speed sensing means includes analog speed sensing means for producing an analog fluidic output signal indicative of the speed of said output means.

3. The combination according to claim 1 including fluidic stall prevention means connected to said power plant comprising a fluid amplifier for producing a fluidic output signal in response to a condition indicative of impending stall in said power plant, and said control means connected to said fluid amplifier to vary the flow of fuel to said power plant in response to said output signal from said fluidic stall prevention means.

4. The combination according to claim 3 wherein said fluidic speed sensing means includes a fluidic analog speed sensor for giving a fluidic signal indicative of the speed of said output means.

5. In combination:
   a power plant having a fluid therein;
   fluidic temperature sensing means in communication with said fluid and operable to produce a first fluidic output signal indicative of the temperature of said fluid;
   fluidic stall prevention means connected to said power plant including fluid amplifier means for producing a second fluidic output signal in response to a condition indicative of impending stall in said power plant; and
   control means connected to said power plant, said temperature sensing means, and said fluidic stall prevention means to receive said first and said second fluidic output signals, said control means being effective to vary the flow of fuel to said power plant in response to said first and second fluidic output signals.

References Cited

UNITED STATES PATENTS

| | | | |
|---|---|---|---|
| 2,863,283 | 12/1958 | Schmider et al. | 60—39.28 |
| 2,931,442 | 4/1960 | Stanton et al. | 60—39.28 |
| 2,947,141 | 8/1960 | Russ | 60—39.28 |
| 3,248,043 | 4/1966 | Taplin et al. | 60—39.28 |
| 3,302,398 | 2/1967 | Taplin et al. | 60—39.28 |

SAMUEL FEINBERG, Primary Examiner